March 28, 1939.   G. W. TEMPLE   2,152,446
MELTING POT
Filed Jan. 18, 1939
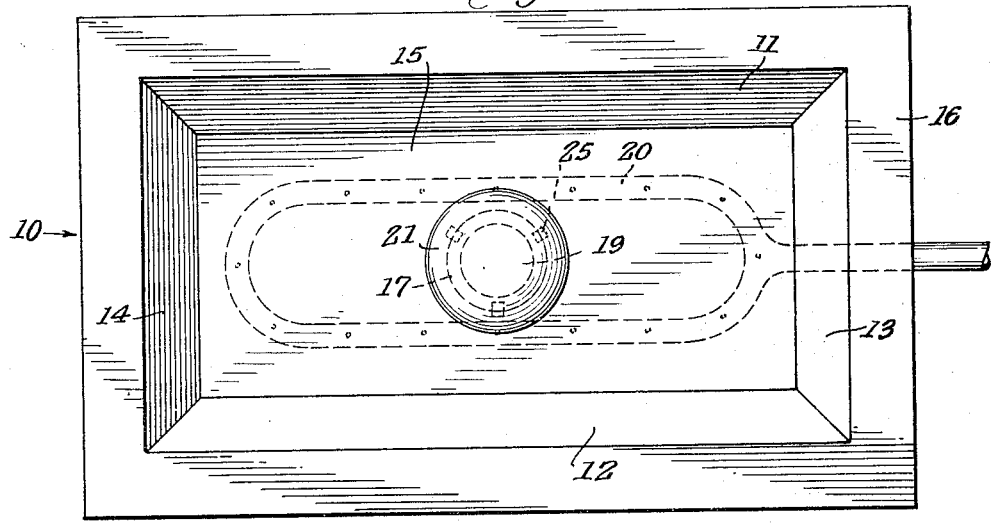
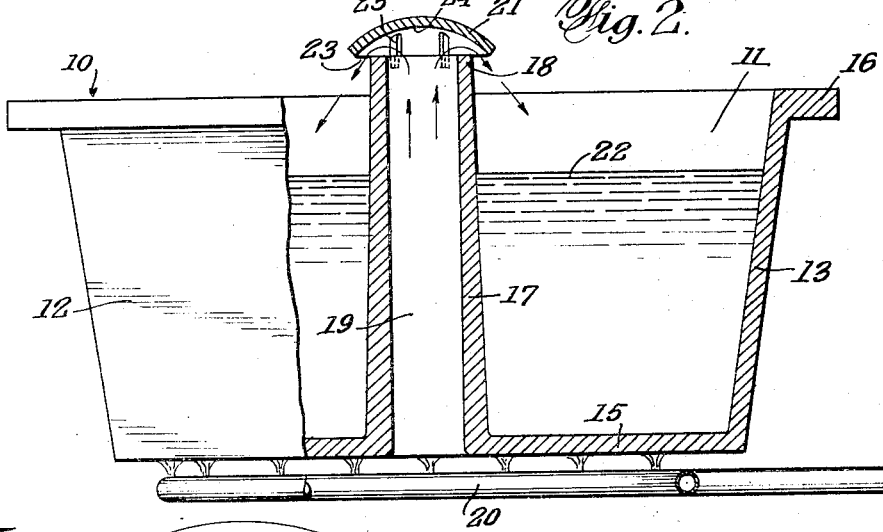
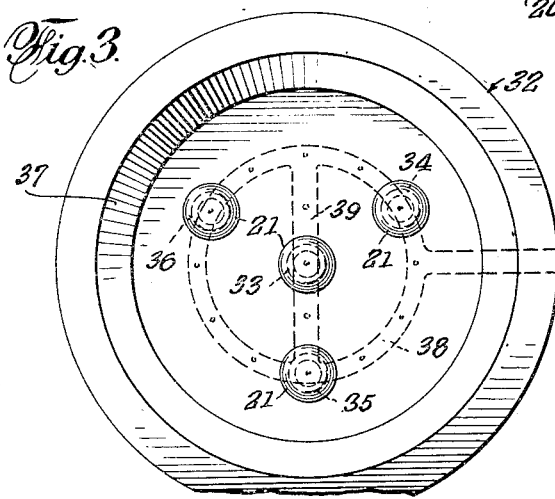
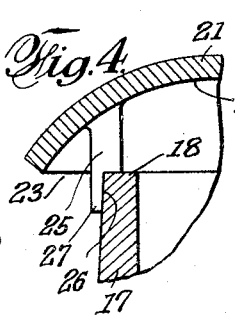
INVENTOR
George W. Temple
BY
Harry Jacobson
ATTORNEY Patented Mar. 28, 1939

2,152,446

UNITED STATES PATENT OFFICE 2,152,446

MELTING POT

George W. Temple, New York, N. Y., assignor to Victor Metal Products Corporation, Brooklyn, N. Y., a corporation of New York Application January 18, 1939, Serial No. 251,463

6 Claims. (Cl. 266—39)

This invention relates to melting pots and particularly to those used for melting quantities of comparatively soft metals such as tin, lead, zinc, aluminum and the like.

Such melting pots are necessarily heavy, being usually made of metal, and are often quite large, having a large capacity. During the process of melting the large mass of metal in the pot, the molten metal expands frequently to such an extent that it breaks the melting pot with serious resulting dangers and losses.

I have found that if the mass of metal is heated more uniformly than has been heretofore possible, the danger of the pot breaking by reason of expansion of the mass of molten metal, is minimized.

My invention therefore contemplates the provision of means for applying heat to the central or other parts of the mass of metal as well as to the sides and bottom thereof, thereby heating the mass more uniformly throughout so that the mass also expands more uniformly and does not put an undue or breaking stress upon the bottom and walls of the melting pot.

My invention further contemplates the provision of a melting pot adapted to heat the metal therein at points in spaced relation to the walls and bottom thereof, and thereby attaining more uniform heating than is otherwise possible.

My invention further contemplates the provision of a melting pot provided with an upright heating flue formed integrally therewith and in spaced relation to the walls of the pot, said flue being provided with means for preventing splashing of the metal thereinto and for also deflecting the heated gases emerging from the flue over the surface of the molten metal and thus forming a blanket of gases over the surface to protect the surface from exposure to the atmosphere and from consequent oxidation.

The various objects of the invention will be clear from the description which follows and from the drawing, in which, Fig. 1 is a top plan view of a melting pot embodying the invention.

Fig. 2 is a front elevation and partial vertical section of the same.

Fig. 3 is a top plan view of a modified form of the invention wherein a number of auxiliary heating flues is provided.

Fig. 4 is a fragmentary vertical section through the removable flue cap.

Fig. 5 is a similar view of a somewhat modified form of the cap.

In the practical embodiment of the invention which I have shown by way of example, and referring particularly to Figs. 1 and 2, the pot 10 is preferably cast of suitable metal and is provided with the downwardly and inwardly inclined side walls 11 and 12 and with the similarly inclined end walls 13 and 14. Said walls are integrally joined at their lower ends by the pot bottom 15, while at their upper ends, is the horizontal outstanding flange 16.

Upstanding centrally of the bottom 15 and formed integrally therewith is the flue 17 terminating at its upper end 18 above the top flange of the pot. The flue surrounds a suitable opening in the bottom and is provided with a suitable interior passage as 19 communicating with the opening in the bottom, for the passage therethrough of the hot gases formed by the heating means 20. Said heating means may take any suitable form but as shown, is made in the form of a gas heater arranged close to the bottom 15 of the pot and designed to heat as large an area of said bottom as is possible, as well as to heat the flue 17.

The removable flue cap 21 serves the double purpose of preventing metal from the molten mass 22 from splashing into the interior of the flue and reaching the heater 20, and also serves the function of deflecting the hot gases rising in the flue toward the interior of the pot and to a position over the surface of the molten mass in the pot. The flue cap is of greater diameter than the upper end 18 of the flue, thereby providing and annular space 23 between the cap and the flue for the downward passage therebetween of the heated gases from the flue. Preferably, the cap is of generally convex form, being provided with an inner concave surface 24 of the proper shape to deflect the rising gases through the annular passage 23 and on to the molten metal surface. To removably maintain the flue cap in position on the flue, a plurality of spaced cap-supporting lugs as 25 are provided. Each of said lugs is provided with a right angle recess as 26, the walls of which engage the upper end of the flue. The arm or projection 27 on the outside of the recess serves to engage the outer surface of the flue and to maintain the cap in its proper position thereon.

As shown in Fig. 5, the lugs 28 may be substituted for the lugs 25, said lugs 28 being provided with a recess 29 extending inwardly from the outer face thereof and thereby providing a wall, arm or projection 30 engaging the inner face 31 of the flue and thereby maintaining the cap in position.

It will be understood that the pot 10 may be of any suitable shape, though it is shown as rectangular in outline in Figs. 1 and 2. For example, in Fig. 3 I have shown the pot 32 as circular in outline. It will further be understood that any number of flues 17 may be provided, and that the flues are situated at the proper points to so heat the mass of metal contained in the pot that the temperature throughout the mass is as nearly the same as is possible. Preferably, the flues are so arranged as to heat all parts of said mass at about the same rate. The number of flues which are used is determined by the area and depth of the pot to which the flues are applied.

In that form of the invention shown in Fig. 3, four flues 33, 34, 35 and 36 are used. One of the flues 33 is preferably arranged centrally of the pot, in the same manner as the flue 17 is arranged in the pot 10. The remaining flues are spaced preferably, though not necessarily, substantially midway between the central flue and the wall 37 of the pot. Each of the flues are provided with a cap 21 as previously described in connection with the flues 17. The heater 38 in this case may be of generally circular form with or without a diametrical cross member as 39 therein to insure adequate heating of the central part of the mass of metal.

It will be understood that the heaters 20 and 38 not only heat the bottom 15 of the pot but also heat the flue or flues, which in turn heat the surrounding metal. The metal is, therefore, heated not only by the bottom of the pot but also by the flues, so that more uniform heating of the mass is attained and the differences in temperature of the mass are minimized and do not cause undue expansion of the metal and consequent tendency to break the pot.

It will further be seen that the gases rising in the flues are deflected by the caps toward the interior of the pot to blanket the exposed surface of the molten metal. The blanket of hot gases serves not only to heat the surface of the metal and hence to obtain still greater uniformity in the temperature of the molten mass, but also serves to protect the surface of the molten metal from contacting with the atmosphere, thereby preventing oxidation of the metal and also preventing the formation of an undue amount of scum or dross.

While I have shown and described certain specific embodiments of my invention, I do not wish to be understood as limiting myself thereto, but intend to claim the invention as broadly as may be permitted by the state of the prior art and the scope of the appended claims.

I claim:

1. In a melting pot for molten metal, a central flue open at both ends and formed integrally with the bottom of the pot, a removable cap for the upper end of the flue, said cap being of greater diameter than said upper end to provide an annular space therebetween, means on the cap for supporting the cap on and in spaced relation to the flue, and a concave under surface on the cap deflecting gases rising in the flue toward the interior of the pot.

2. In a melting pot for molten metal, a hollow flue open at both ends, means for heating the pot and the flue, a flue cap having a concave inner surface and of greater outer diameter than that of the top of the flue, and means on the cap for removably supporting the cap coaxially of the flue and with said inner surface in outward spaced relation to the top of the flue.

3. A melting pot for molten metal, said pot having side walls joined by a bottom wall, said bottom wall having an opening therein, a flue upstanding from the bottom wall to a point above the top of the pot and surrounding the opening, and a gas-diverting cap on and spaced outwardly from the top of the flue.

4. A melting pot for molten metal, said pot having side walls joined by a bottom wall, said bottom wall having an opening therein, a flue upstanding from the bottom wall to a point above the top of the pot and surrounding the opening, and a gas-diverting cap on and spaced outwardly from the top of the flue, said cap having an inner concave surface of greater outer diameter than that of the top of the flue and having spaced depending supporting lugs thereon.

5. In a melting pot for molten metal, downwardly and inwardly tapered side walls, a bottom wall joining the lower edges of the side walls and having an opening therein, a hollow flue open at both ends surrounding the opening and upstanding integrally from the bottom wall and of greater height than the side walls, means for heating the bottom wall and the flue, and a cap for the top of the flue preventing the splashing of molten metal into the flue, said cap having an inner concave surface of greater diameter than that of the flue top and having recessed lugs depending from the inner surface, said lugs receiving the top part of the flue and supporting the cap in spaced relation to the flue top to provide an annular space therebetween, and the inner surface diverting gases rising into the flue toward the interior of the pot to provide a blanket of hot gases for the surface of the metal in the pot.

6. In a melting pot for molten metal, a plurality of flues each upstanding from the bottom wall of the pot and each open at both ends, a gas-diverting and protecting cap for each of the flues, and means for heating the bottom wall of the pot and said flues.

GEORGE W. TEMPLE.